June 18, 1929.   W. E. RIZA   1,717,409
COTTON HARVESTER
Filed Aug. 13, 1925   4 Sheets-Sheet 2

Inventor
W. E. Riza
By C. A. Snow & Co.
Attorneys.

June 18, 1929.  W. E. RIZA  1,717,409
COTTON HARVESTER
Filed Aug. 13, 1925  4 Sheets-Sheet 4

Inventor
W. E. Riza
By C. A. Snow & Co.
Attorneys.

Patented June 18, 1929.

1,717,409

UNITED STATES PATENT OFFICE.

WILL E. RIZA, OF NEMO, TEXAS.

COTTON HARVESTER.

Application filed August 13, 1925. Serial No. 50,077.

This invention relates to a machine for harvesting cotton, one of the objects being to provide a machine of this character adapted to be drawn along the rows of standing plants in a field and to remove the cotton from the plants, separate the cotton fiber from the hulls, leaves and other trash and deliver the cotton from the machine.

A further object is to provide a simple and compact machine of this character which utilizes air as a means for conveying the picked cotton to the separator and for delivering the cotton from the machine.

A further object is to provide simple and efficient means for beating the plants so as to remove the cotton bolls therefrom.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Referring to the figures by characters of reference 1 designates a frame supported by wheels 2 and adapted to be driven by a motor indicated generally at 3, this motor being controlled by any suitable means and adapted to operate a transmission shaft 4.

Figure 1:
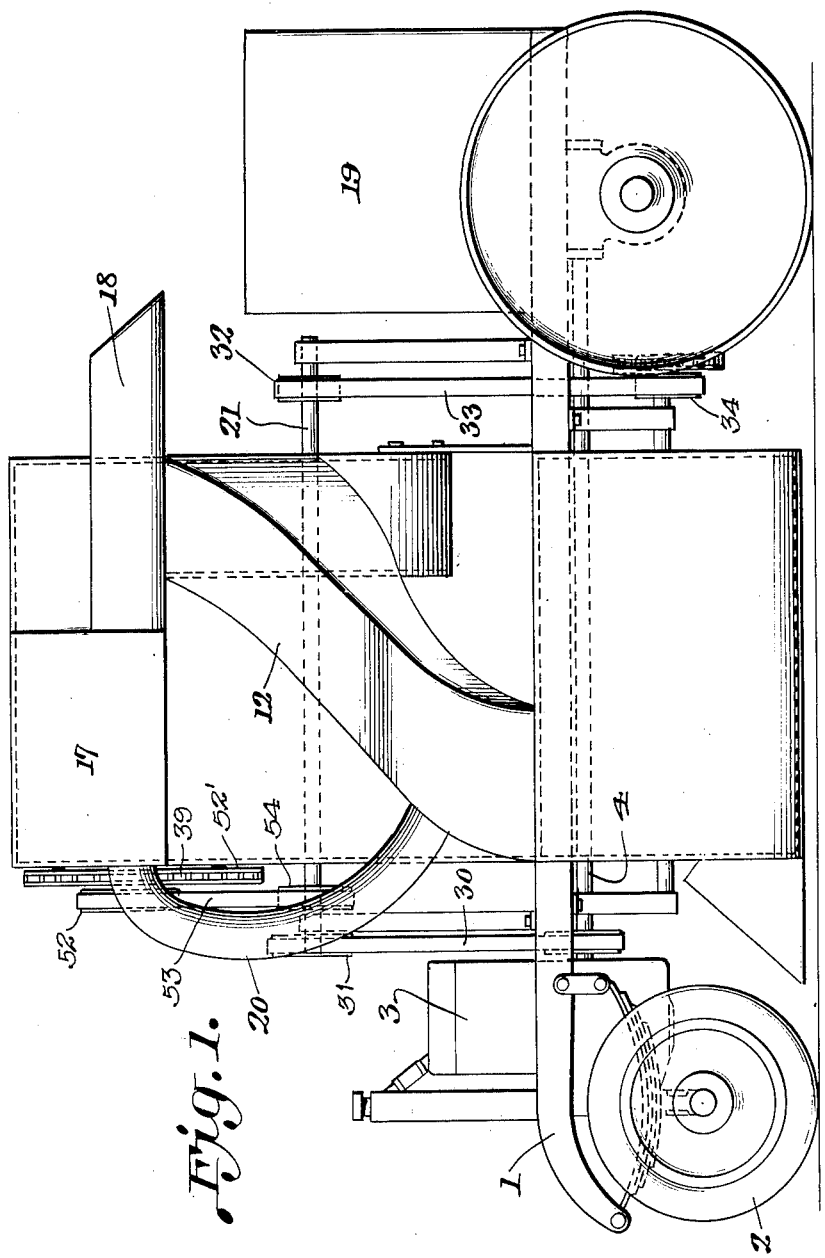
Figure 1 is a side elevation of the machine.
Figure 2:
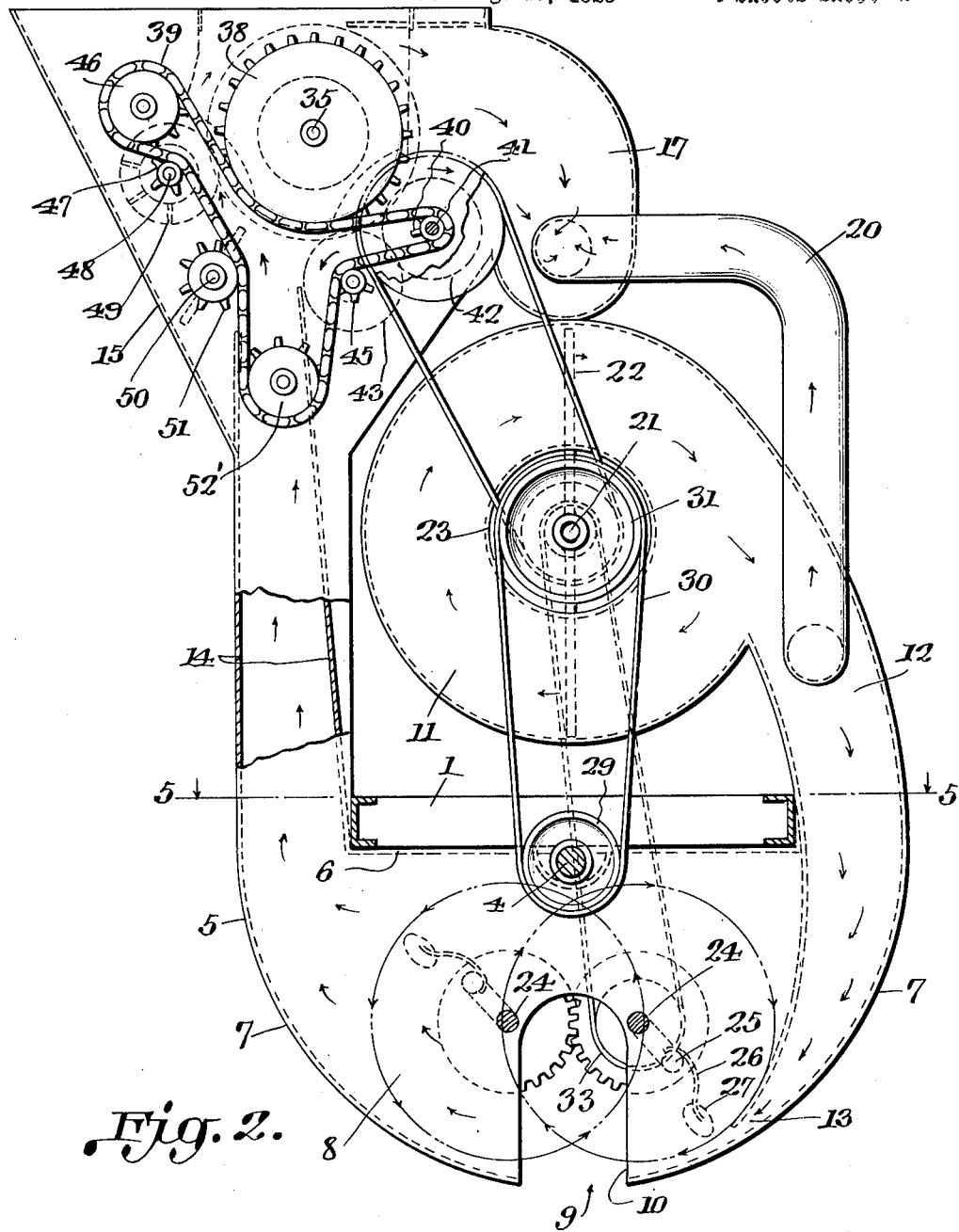
Figure 2 is a front elevation of the housing and a portion of the operating mechanism.
Figure 3:
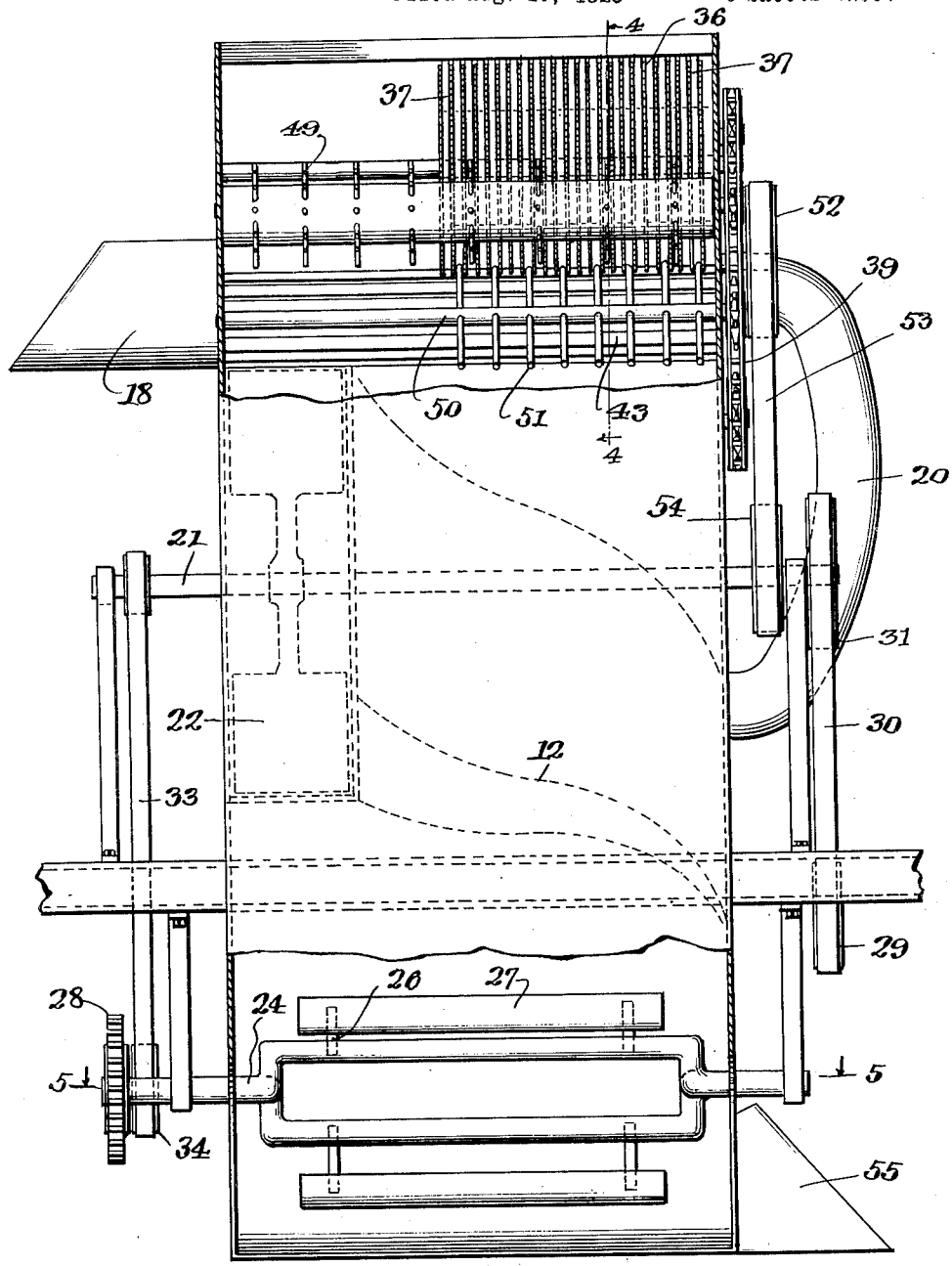
Figure 3 is a view partly in side elevation and partly in section showing the separating mechanism and one of the beaters.
Figure 4:
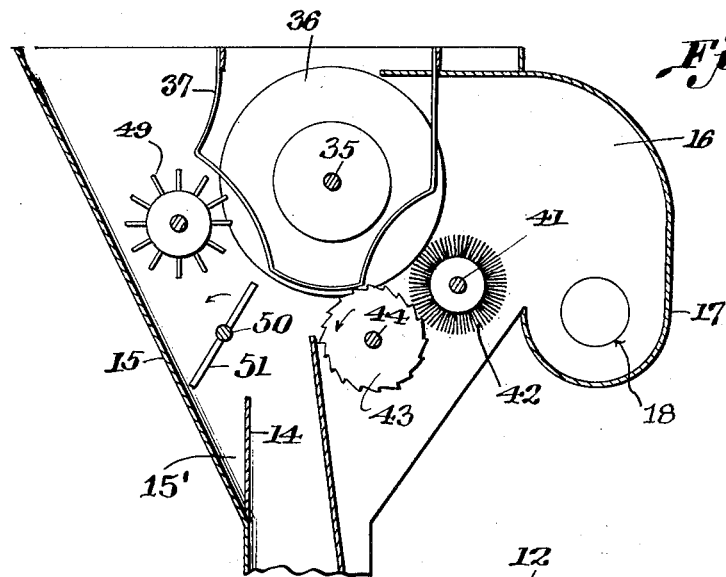
Figure 4 is a section through the separator on the line 4—4 Figure 3 some of the saws and ribs being removed.
Figure 5:
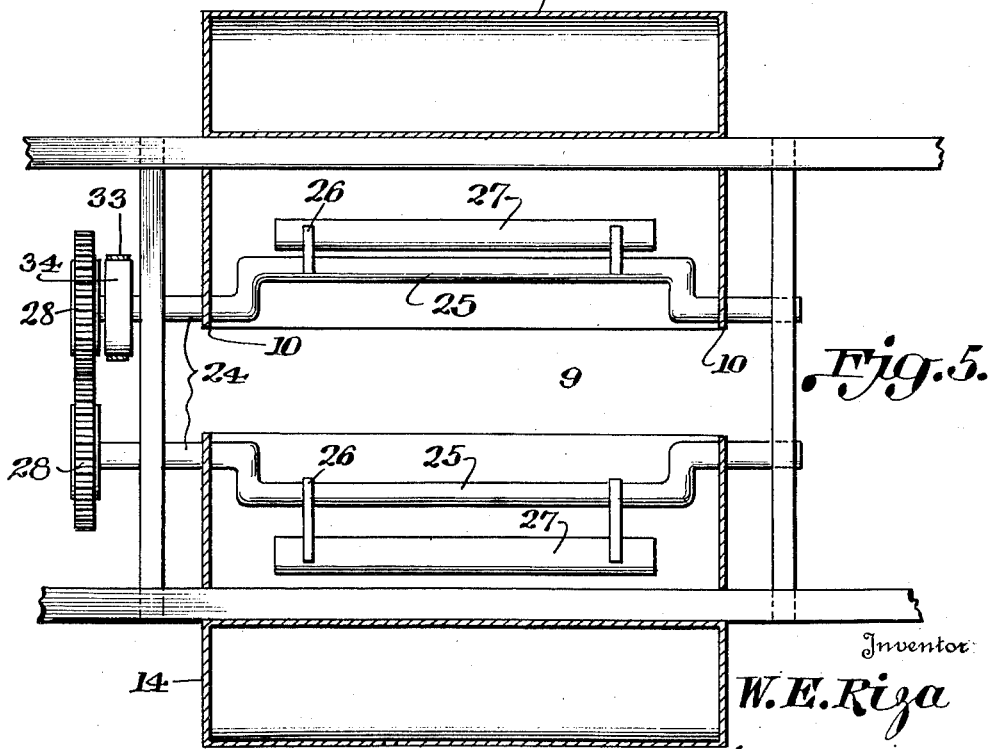
Figure 5 is a section on line 5—5 Figure 3, the beaters being shown in plan.

Erected on the frame 1 is a housing 5 closed at the top, as shown at 6, at the side, as shown at 7, and at the ends, as shown at 8. The bottom of the housing is open, as shown at 9 and openings 10 are provided in the end walls of the housing at the ends of the opening 9, thus to provide a clearance extending centrally along the housing from the front to the back thereof. This clearance is sufficiently large to receive standing plants when the housing is moved along and astride a row of plants. A fan casing 11 is supported above the frame 1 and has an outlet flue 12 extending therefrom and opening into one side of the housing 5. The inner and outer walls of this flue converge as shown in Figure 2 so as to provide a restricted outlet or throat 13 extending longitudinally of the housing at one side of the opening 9. Another flue 14 is extended upwardly from the other side of the housing and opens into the bottom portion of a separator casing 15. One side of the separator casing has a pocket 15' for receiving trash and this pocket can have a suitable outlet, not shown. The other side of the casing opens into a receiving compartment 16 formed within an extension 17. An outlet spout 18 projects from the rear end of this extension and is adapted to deliver cotton into a receptacle 19 carried by the frame 1. Opening into the front end of the compartment 16 within extension 17 is a branch flue 20 extending from the flue 12.

A shaft 21 is journaled within the fan casing 11 and carries a fan 22 of any suitable construction for forcing an air blast downwardly into the flue 12. As this current of air can not escape through the throat 13 as rapidly as it is directed into the flue 12, a back pressure will be set up through the flue 20 so that a current of air will be directed longitudinally through the compartment 16 for the purpose of expelling cotton through the spout 18 into the compartment 19. The air inlet to the fan casing 11 has been indicated at 23. Journaled within the housing 5 at opposite sides of the upper portion of the openings 10 are longitudinal shafts 24, those portions of the shafts within the housing being offset as at 25 and provided with arms 26 to which are connected longitudinally extending bars 27 constituting beaters. Gears 28 are attached to the rear ends of these shafts 24 and are constantly in mesh so that the two shafts will rotate in opposite direction and cause the beaters 27 to swing across the clearance space extending longitudinally within the housing 5.

The shaft 4 is provided with a pulley 29 adapted to transmit motion through a belt 30 to a pulley 31 secured to the shaft 21 of the fan 22. These pulleys and belt are located preferably in front of the housing. A pulley 32 is secured to the rear portion of the shaft 21 and is designed to transmit motion through a belt 33 to a pulley 34 secured to one of the shafts 24.

A shaft 35 is journaled within the casing 15 and carries a gang of gin saws 36, therebeing a series of ribs 37 extending bewteen the saws. A sprocket 38 rotates with the shaft 35 and receives motion through a chain 39 from a sprocket 40 secured to a shaft 41. To this shaft is secured a spiral brush 42 constituting a doffing element located adjacent the point of communication between the casing 15 and the extension 17. A toothed or serrated cylinder 43 is mounted for rotation close to and below the saws and brush and constitutes means for knocking burrs and the like from the saws and the fibers engaging the same. This knocker 43 is mounted on a shaft 44 journaled in the casing or housing 15 and provided with a sprocket 45 actuated by the endless chain 39. Chain 39 is extended over an idler sprocket 46 and engages a sprocket 47 secured to a shaft 48 which is journaled in the housing or casing 15. To this shaft are connected radial fingers 49 for knocking trash away from the cotton as it comes against the saws. Below this shaft 48 is another shaft 50 having a sprocket 51 engaged by the chain 39, said chain being extended therefrom downwardly under an idler sprocket 52'. Shaft 50 has fingers 51 radiating therefrom in opposed longitudinal series, these fingers serving to engage and knock twigs and the like from the bolls.

For the purpose of operating the mechanism of the separator a pulley 52 is secured to the shaft 41 and is driven by a belt 53 receiving motion from a pulley 54 on shaft 21.

Obviously when the machine is in operation motion will be transmitted to the various parts through the mechanism described. The machine is adapted to straddle a row and by provided deflecting guards 55 which are extended forwardly from the sides of the front opening 10 plants will be gathered and caused to properly enter the openings 10 so as to come into the paths of the rotating beaters or bars 27. As these rotate in opposite directions they will operate to knock the bolls from the plants. At the same time a strong blast of air will be expelled from the mouth 13 across the clearance space within the housing with the result that the parts detached from the plants will be blown upwardly into and through the flue 14 and into the pass between the rotating fingers 51 and the cylinder 43. Fingers 51 will knock the twigs and the like away from the burrs and throw said burrs against the saws and the trash knocking cylinder with its fingers 49. These fingers serve to knock the trash downwardly or outwardly from the cotton fibers while at the same time the rotating saws 36 will engage the fibers and carry them past the cylinder 43 and into position to be doffed by the brush on shaft 41. In passing over the cylinder 43 the burrs will be separated from the fibers and the fibers will be removed from the saws by the brush and thrown into the compartment 16. Here the fibers will receive the force of an air blast directed into the compartment 16 from the branch flue 20 and, consequently, the fibers will be delivered through the spout 18 into the receptacle 19.

Instead of utilizing a receptacle on the vehicle as shown, the cotton can be delivered from the spout 18 into another vehicle or into a trailer, as will be obvious.

What is claimed is:

A cotton harvester including a portable housing having a longitudinal plant receiving clearance in the bottom thereof, parallel shafts journalled within the housing at opposite sides of said clearance for receiving the upper portions of plants therebetween, means for rotating the shafts simultaneously in opposite directions respectively, a beating bar parallel with each shaft and mounted to swing within a circle in the housing, each bar adapted to travel entirely across the plant receiving clearance from one side of the lower portion thereof upwardly beyond and above the opposite side of the clearance thereby to engage the lower portion of a plant at one side adjacent the bottom of the plant and beat upwardly along the plant and bend it laterally in one direction to strip cotton bolls therefrom, a blower, and a flue for conducting an air blast from the blower within the housing and delivering it in a thin sheet across the bottom portion of the clearance into the opposed portion of the housing thereby to carry upwardly within the housing the detached portions of the plants being acted on.

In testimony that I claim the foregoing as my own, I have hereto affixed my signature.

WILL E. RIZA.